United States Patent [19]

Hogan et al.

[11] Patent Number: 4,800,093

[45] Date of Patent: Jan. 24, 1989

[54] HIGH MOISTURE ANIMAL FOOD PRODUCT CONTAINING A FILAMENTOUS FUNGAL BIOMASS

[75] Inventors: William C. Hogan, Bridgeton; Dennis O. Gierhart, High Ridge, both of Mo.

[73] Assignee: Ralston Purina Company, St. Louis, Mo.

[21] Appl. No.: 56,367

[22] Filed: May 28, 1987

Related U.S. Application Data

[63] Continuation of Ser. No. 829,885, Feb. 18, 1986, abandoned.

[51] Int. Cl.$^4$ ............................................. A23K 1/00
[52] U.S. Cl. ............................... 426/46; 426/52; 426/56; 426/61; 426/521; 426/805
[58] Field of Search .................. 426/61, 52, 53, 641, 426/644, 646, 46, 56, 521, 805

[56] References Cited

U.S. PATENT DOCUMENTS

| | | | |
|---|---|---|---|
| 3,917,851 | 11/1975 | Arnaud et al. | 426/46 |
| 3,930,031 | 12/1975 | Kealy | 426/805 |
| 3,974,030 | 8/1976 | Kobayashi | 426/46 |
| 4,000,319 | 12/1976 | Eichelburg | 426/805 |
| 4,070,490 | 1/1978 | Lugay et al. | 426/647 |
| 4,265,915 | 5/1981 | Maclennan | 426/46 |
| 4,310,558 | 1/1982 | Nahm | 426/805 |

*Primary Examiner*—R. B. Penland
*Attorney, Agent, or Firm*—Virgil B. Hill

[57] ABSTRACT

A high moisture animal food product containing meat is disclosed in which a portion of the meat is replaced with a filamentous fungal biomass, produced from the fermentation of a medium such as soybean whey by a fungi, such as *Aspergillus Oryzae*. An unexpected improvement in palatability is obtained with meat products containing the fungal biomass.

13 Claims, No Drawings

HIGH MOISTURE ANIMAL FOOD PRODUCT CONTAINING A FILAMENTOUS FUNGAL BIOMASS

This is a continuation of application Ser. No. 829,885, filed Feb. 8, 1986 now abandoned.

BACKGROUND OF THE INVENTION

The present invention relates to an animal food product having an improved degree of palatability wherein a significant portion of the edible protein in the animal product is provided by a filamentous fungal biomass.

Animal foods such as pet foods have been sold as three distinct types of product. A dry product is generally characterized as a pet food product which has a moisture content below about 15% by weight and comprises a mixture of proteinaceous and farinaceous grains or other materials that are extruded and dried to ambient moisture to provide a product that is highly palatable and convenient for a consumer to feed a pet. Intermediate moisture or so called "soft-moist" pet foods generally have a higher moisture content of about 15 to 45% by weight and while they contain similar ingredients as compared to a dry pet food they often will include fresh meat as an ingredient. Soft Moist products, however, required the addition of various materials to provide microbiological and antimycotic stability for the product. These additions quite often lower the palatability of the pet food.

High moisture pet food products, generally have a moisture content exceeding 45% by weight and for the most part contain meat as the primary ingredient. Typically these products are sterilized and canned. More recently various proteinaceous ingredients have been considered to be desirable to add to canned or high moisture pet food products for improving the characteristics of these products. Such a product is described in U.S. Pat. No. 3,865,966 in which an expanded vegetable protein chunk is included with the ingredients to provide a canned or high moisture pet food product which has a highly desirable appearance. While the use of expanded vegetable protein chunks such as those described above have lowered the ingredient cost to a producer of canned pet food, the cost of meat is these products is still the limiting factor insofar as the cost and availability of this type of product.

It has been recognized, in U.S. Pat. No. 4,039,687, that a portion of the meat contained in a pet food can be replaced with a synthetic protein which is produced by the fermentation of yeast on hydrocarbons. While the addition of synthetic protein grown on a hydrocarbon substrate may have at one time provided a means of reducing the overall cost of the product, synthetic protein produced by the fermentation of various organisms on hydrocarbons has itself become a fairly expensive product because of the high cost of petroleum hydrocarbons used for the substrate.

Therefore a need still exits for a proteinaceous ingredient that can be added to animal food products particularly high moisture animal food products containing meat that provides an effective and palatable substitute for meat yet provide a source of protein that is economical and reliable to use and provides a cost advantage to the producer.

It is therefore an object of the present invention to provide an animal food product having an improved degree of palatability.

It is a further object of the present invention to provide a high moisture animal food product having an improved degree of palatability in which a portion of the protein is replaced by a filamentous fungal biomass.

It is a further object of the present invention to provide an animal food product in which a portion of the fresh meat is replaced with a filamentous fungal biomass to provide a high moisture pet food product of improved palatability to animals such as cats and dogs. These and other objects of the present invention will be apparent from the following description.

SUMMARY OF THE INVENTION

The present invention relates to an animal food product having an improved degree of palatability wherein a significant portion of the edible protein in the animal product is replaced by a filamentous fungal biomass. The process of producing the animal food product of the present invention comprises forming a mixture of fressh meat and a filamentous fungal biomass; by reducing the particle size of said mixture to a substantially uniform size; and heating said mixture to form an animal food product having an improved degree of palatability.

The use of a filamentous fungal biomass for replacement of a portion of the fresh meat contained in a high moisture pet food provides a product having a lower ingredient cost than conventional high moisture pet food products and unexpectedly provides an improvement in palatability over high moisture pet food products that contain only meat. The filamentous fungal biomass may be incorporated in the high moisture pet food in amounts ranging from about 1 to 18% fungal biomass solids by weight of product solids on a dry basis and preferably about 2 to 12% fungal biomass solids by weight of the product solids on a dry basis. Furthermore the animal food product of the present invention containing the filamentous fungal biomass unexpectedly provides an improvement in palatability whether the product is fed to cats or to dogs. Typically, cats are considered much more selective feeders than are dogs and therefore products of this type are somewhat more difficult to maintain a high level of palatability to cats than to dogs. It is indeed unexpected that incorporation of the filamentous fungal biomass of the present invention into a high moisture pet food product containing meat unexpectedly improves the palatability of the product to cats as well as dogs.

DESCRIPTION OF THE PREFERRED EMBODIMENTS

In preparing the animal food product of the present invention, a filamentous fungal biomass is used as a replacement for a portion of the meat contained in a high moisture pet food product. The class of fungi that is identified as filamentous generally refers to that group of fungi having a hyphae or mycelium as contrasted with yeast which lacks this characteristic type of filamentous structure. The filamentous fungal biomass employed in the present invention comprises a biomass that has been produced by growth of the fungi on a suitable medium. A variety of edible, non-toxic filamentious fungi can be used in the present invention including molds selected from the genuses consisting of Aspergillus, and Rhizopus. Particularly preferred are the molds Aspergillus Oryzae and Aspergillus Niger. It is not critical insofar as the production of the filamentous fungal biomass, what specific medium or substrate is used for growth or reproduction of the mold to produce a fungal biomass that can be utilized in the present invention and a variety of grain products or aqueous wastes resulting from grain processing can be employed as a suitable substrate. An economical and preferred substrate for the filamentous fungal biomass employed in the present invention is soybean whey which represents the waste supernatant from the processing of soy isolate.

Soybean whey is the waste liquor or effluent obtained in the isolation of soy protein. Soybean whey is typically produced by a process of extracting the water soluble constituents from defatted soybeans or defatted soybean flakes with water. The protein solubilized in this procedure is then precipitated at the isoelectric point to separate the protein as a curd. The precipitated protein is then washed, neutralized and dried for sale as an isolate. The supernatant resulting from the acid precipitation step, represents the waste liquor or as soybean whey which is an effluent that is produced in large quantities from soy isolate or soy concentrate processing. Soy whey, because of its inherent nitrogen content and soluble sugar level represents a disposal problem insofar as is introduction into sewage systems nevertheless the same high level of nitrogen and sugar level that makes it a disposal problem also provides a suitable source for the fermentation of microorganisms and consequently the production of protein biomasses by the growth of filamentous fungi on soybean whey to provide useful food ingredients such as that set forth in the present invention.

The soybean whey that is used as the growth medium for the fungi in the present invention, typically contains a solids level of about 1.2 to 1.5% by weight with a nitrogen content of about 3.6 to 4.4% by weight of the solids. Typically the soybean whey will have a pH of about 4.2 to 4.7.

The soybean whey used as the media for the production of the filamentous fungal biomass used in the present invention is initially sterilized or pasteurized such as by heating or other means for elimination of any contaminating microorganism that might be present in the soybean whey. Typically, heating of the soybean whey to a temperature of at least about 120° C. for a period of time sufficient to sterilize or pasteurize the whey will prevent the growth of other microorganisms or fungi after inoculation. Typically, the soybean whey is sterilized by heating at a temperature of at least about 120° C. for between about 10 to 20 minutes in order to make the whey suitable for inoculation with the desired fungi as hereinafter described.

Following sterilization of the soybean whey, the whey is inoculated with a filamentous fungi from the genuses Aspergillus or Rhizopus preferably those of the genus Aspergillus and most preferably either *Aspergillus Oryzae* or *Aspergillus Niger*. Either of these Aspergillus fungi species have been found to provide an inoculum for the soybean whey which results in the production of proteinaceous fungal biomasses that have excellent suitability as a replacement for a portion of the meat contained in pet food products.

Following inoculation of the soybean whey with spores of the Aspergillus mold, the slurry containing the organism is then allowed to ferment under conditions effective for growth of the biomass. Typical conditions for the production of the fungal biomass on the soybean whey, is maintaining the pH of the inoculated medium at about 3.8 to 5.8 and preferably 4.0 to 4.4. It also essential to maintain the temperature of fermentation to about 28° to 32° C. and preferably about 30° C. for achieving the maximum yield of fungal biomass. Although it is not critical to the practice of the present invention, nevertheless mechanical agitation or agitation with the introduction of air in the inoculated media is a conventional step insofar as fermentation processes and should be carried out for improved growth and distribution of the microorganism throughout the mass and for purposes of maximizing the yield of biomass. It is also preferred, but not critical, that the dissolved oxygen level of the fermentation medium be maintained at a level sufficient for rapid growth of the filamentous fungi and preferably about 50% of oxygen saturation of the medium at the temperature of fermentation and most preferably greater than about 80% by weight of the fermentation medium. The desired level of dissolved oxygen can be maintained by bubbling of air or oxygen into the medium which as noted above, also provides a means for agitation.

The exact time required for growth of the filamentous fungal biomass is a factor that is dictated primarily by the quantity of fungal biomass desired as well as the exact conditions of pH or temperature employed. Typical times for growth of the filamentous fungal biomass on a soybean whey medium is generally between about 10 to 30 hours and preferably 20 to 24 hours.

Following growth of the filamentous fungal biomass, the biomass is concentrated from the fermentation medium by centrifugation, filtration or similar means. The exact manner of removing the biomass from the fermentation medium is not critical insofar as the present invention. The filtered fungal biomass produced by the above process at least on soybean whey, typically has a solids level of about 5 to 17% by weight and preferably 10 to 12% by weight with a protein level of about 40% by weight on a dry basis.

The filamentous fungal biomass, produced as generally described above, is employed in the formulation of a high moisture animal food product pursuant to the present invention in which the filamentous fungal biomass replaces a portion of the meat typically includes in products of this type. In preparing the high moisture animal food product of the present invention natural meats such as poultry, fish or animal meats and meat by-products having the requiste quality and palatability are first selected and formulated. Depending on the flavor of palatability to be imparted to the food product the meat or meat by-products may be selected from a wide range of materials. Among the various types of meat that can be employed in the present invention include various types of beef such as beef gullets, beef cheek trims, beef heart caps or carcass beef. Furthermore, various types of liver such as pork liver or beef liver may be also readily employed to produce animal food products having excellent palatability. Various other types of meats such as ground chicken or various types of whole ground fish may also be employed depending upon the animal to which it is intended to be fed. It is to be understood that other types of meats or various meat by-products which are suitable for animal consumption may be used for the practice of the present invention depending on the flavor and palatability it would impart to the final food product.

Preferably the meat type employed is a fresh meat product and these are selected and formulated to provide a level in the high moisture pet food of about 0.5 to 29% meat solids by weight of the product solids on a dry basis. While the exact level of filamentous fungal biomass, surprisingly may be varied over a very wide range it is preferred that the filamentous fungal biomass be incorporated in the animal food product at a level of about 1 to 18% fungal biomass solids by weight of the product solids on a dry basis and preferably 2 to 12% fungal biomass solids by weight of the product solids on a dry basis. It is indeed surprising that such a significant portion of the most desired ingredient contained in the pet food, i.e. fresh meat, can be replaced and unexpectedly provide a product which has an improved degree of palatability over products containing meat without the biomass.

The meat employed in the production of the high moisture pet food product of the present invention and a filmentous fungal biomass are formed into a mixture prefereably by maintaining the fresh meat and fungal biomass in a chilled or frozen state which typically means maintaining these products at a temperature ranging from about $-20°$ F. to $+40°$ F. The meat and fungal biomass in the indicated proportions selected for use in the product of the present invention are then passed through a meat grinder in the frozen or semi-frozen state, preferably equipped with a ⅛ inch grinding plate to reduce the meat and the fungal biomass into pieces of a substantially uniform size. While the specific size of ⅛ inch for the ground meat and fungal biomass is preferred for most of the animal food products produced in accordance with the present invention it will be understood that satisfactory results may be obtained by grinding the meat to particle sizes ranging from ⅛" to 1" depending upon the type of product preferred and whether or not the product is to be fed to dogs or cats. For example in a cat food product a smaller particle size of what is preferred over other products such as dog foods.

The ground mixture of filamentous fungal biomass and fresh meat having a substantially uniform particle size can thereafter be mixed with other ingredients contained in the high moisture pet food which are not critical to the practice of the present invention. Typically these materials comprise various nutritional balancing ingredients to provide nutritional balance for the pet food product and include various additives such as fat, vitamins and/or coloring materials for improving the appearance of the product. These additives are combined with the combination of meat and filmentous fungal biomass followed by heating the mixture at a temperature of about 120° to 140° F. preferably for a period of time that is non-critical but usually is between about 30 to 240 minutes and preferably 45 to 75 minutes. This heating step may also be used to pasteurize the meat and filamentous fungal biomass.

The mixture of meat and filamentous fungal biomass as well as the various additives includes for purposes of nutritional balancing is then combined in a container and carried to the retort or cooking stage for microbiological stabilization or sterilization of the product. Although the most common and preferred means of packaging high moisture pet food products is the use of conventional cans and procedures for canning nevertheless the present invention may be also employed to produce an aseptically packaged pet food product in which the mixture is sterilized prior to packaging in a flexile type of container which is then sealed to prevent microbiological degradation of the product.

The mixture of filamentous fungal biomass and meat is then introduced to the container and either sterilized prior to addition to the container or in the container. In the case of canned products, conventional retorting procedures may be employed for heating the cans at a temperature and pressure sufficient to sterilize the product. While this will vary somewhat depending upon the type of operation involved, typical retorting temperatures will range between 245° to 250° F. at 15 PSI for approximately 65 minutes for good results. Although it will be understood that higher or lower temperatures may be used for retorting with either shorter or longer periods of time. On completion of the proper heating cycle, during the retorting operation the cans are cooled, rinsed and allowed to dry.

The animal food product of the present invention in which a portion of the meat is replaced by a filamentous fungal biomass provides a product having an improved degree of palatability to both cats and dogs over products containing meat alone. Furthermore the addition of the filamentous fungal biomass does not detract from the appearance of fresh meat product and furthermore provides a product not only having the appearance of an all meat product but it has improved palatability over products containing meat alone. The following examples represent specific non-limiting embodiments of the present invention.

EXAMPLE 1

A filamentous fungal biomass was prepared by the following procedure. 200 l of soybean whey, which has been refrigerated and stored at 7°-10° C. to prevent microorganism growth having a solids level of about 1.5% by weight was pumped into a 300 l stainless steel fermentor, identified as a "Chemapec" unit, manufactured by Chemapec, 230 Crossways Park, Woodbury, NY 91797. This unit has means for controlling pH, dissolved oxygen level, agitation and has temperature control. The temperature of the soybean whey was raised to about 121° C. over a period of 10-20 min and held for 15 minutes at 121° C. with agitation to sterilize the soybean whey.

In a separate operation, sufficient inoculum for the soybean whey was prepared as follows. To each of seven 2 L Erlenmeyer flasks 400 ml of the soybean whey is added. The whey was sterilized by heating at 121° C. for 15 minutes. To one of the seven flasks 1 ml of a suspension of Aspergillus oryzae spores (NRRL 2217) was added. The flask to which the mold was added was then shaken at 400 r.p.m. and maintained at 30° C. for a period of 12-24 hours or until adequate growth of the mold was achieved. The mold growth was judged to be adequate when the culture is whitish with the appearance of applesauce. If inadequate growth has occurred the media is thin and watery. The culture from the single flask was then divided equally among the six other flasks containing sterilized soybean whey. The flasks were then shaken at 400 r.p.m. and maintained at 30° C. for a period of 12-24 hours or until adequate growth of the mold was achieved as described above.

The culture obtained from the six flasks was then divided between two 20 l fermentors described as "LSL/Biolafitte" units manufactured by LSL/Biolafitte, 719 Alexander Rd., Princeton, NH 08540. Each of these fermentors contained 13 liters of the sterilized soybean whey. growth of the mold was then carried out in the fermentor for a period of 20-22 hours. During this time the pH of the inoculated medium was maintained at 4.2±0.2, and the dissolved oxygen level at 80% of saturation. The medium was agitated at 350 r.p.m. and maintained at a temperature of 30° C.±2° C. for the noted period of time.

Following elapse of the noted period of time, the contents of the two 20 l fermentor were added to the remaining sterilized soybean whey contained in the 300 l fermentor. After which growth of the mold was allowed to proceed for the period of time and under the conditions described above to produce a larger quantity of a filamentous fungal biomass.

The contents of the fermentor were then gravity filtered through cheese cloth to yield 8500 g of a filamentous fungal biomass product having a solids level of 10% by weight. This wet biomass can then be frozen and is then used to produce the animal food products described below.

EXAMPLE 2

To evaluate the effect of the filamentous fungal biomass produced in Example 1, two cat food products having the following formulas were prepared. One product designated as Sample "A" contained the biomass and the other product designated as a "control" did not contain the biomass.

| Ingredient | Control | Sample A |
| --- | --- | --- |
| Liver Digest | 2.0 | 2.0 |
| Whole Chicken Carcass | 55.0 | 50.0 |
| Filamentous Fungal Biomass From Example 1 | — | 5.0 |
| Beef Lungs | 10.0 | 10.0 |
| Liver | 3.0 | 3.0 |
| Poultry Meal | 5 0 | 5.0 |
| Vegetable Gums | 1.0 | 1.0 |
| Vitamin and Minerals | 1.2 | 1.2 |
| Water | 22.8 | 22.8 |
| | 100.0% | 100.0% |

The products were prepared by grinding the fresh meat and in the case of Sample A, the biomass at a temperature of about 30° F., through a grinder equipped with a ⅛ inch grinding plate. The ground mixture of fresh meat (and biomass) was placed in a heating unit and heated to a temperature of 120° F. The remainder of the ingredients in the above formulas were then added in the indicated amounts. The mixture is maintained at a temperature of 120° F. for 45 minutes and conveyed to can filling equipment at which point the cans containing the mixture are filled and sealed. The cans were then placed in baskets which were lowered into vertical retorts operated at a temperature of about 245°–250° F. The cans were held at this temperature for about 65 minutes. The cans were cooled, rinsed and allowed to dry.

The two canned products were fed to a group of 18 cats for a period of 4 days to determine the comparative palatability of each product. The test results are set out in Table 1 below.

TABLE 1

| Sample | Total Consumption (gms) | No. of Cats Preferred | Statistical Significance |
| --- | --- | --- | --- |
| Control | 5640 | 0 | P .01 |
| A | 9918 | 16 | |

It is readily apparent that the canned product containing the fungal biomass was significantly preferred by the cats over the control sample which did not include the biomass.

EXAMPLE 3

A filamentous fungal biomass was produced as described in Example 1 except that 0.5% by weight/volume of the whey of ground corn was added to the whey before inoculation with the *A. oryzae*. The biomass harvested from the process had a solids level of 5% by weight. Three canned cat food products were then produced having the following formulas; one was designated a "control", and the other two products designated as Samples B and C contained the fungal biomass in the indicated amounts.

| Ingredient (% by weight) | Control | Sample B | Sample C |
| --- | --- | --- | --- |
| Liver Digest | 2.0 | 2.0 | 2.0 |
| Whole Chicken Carcass | 55.0 | 12.0 | 12.0 |
| Beef Lungs | 10.0 | — | — |
| Fungal Biomass | — | 56.8 | 56.8 |
| Liver | 3.0 | 4.0 | 4.0 |
| Poultry Meal | 5.0 | 6.0 | 6.0 |
| Soy Meal | — | 6.0 | 6.0 |
| Water | 22.8 | 8 0 | 8.0 |
| Vitamins and Minerals | 1.2 | 1.2 | 1.2 |
| Gum Premix | 1.0 | — | — |
| Ground Corn | — | 2.0 | 2.0 |
| Wheat midds | — | 2.0 | 2.0 |
| | 100.0% | 100.0% | 100.0% |

The above products were prepared by grinding the fresh meat and in the case of Sample B and C the biomass, at a temperature of about 30° F., through a grinder equipped with a ⅛ inch grinding plate. The ground mixture of fresh meat and biomass was placed in a heating unit and heated to a temperature of 120° F. The other ingredients in each of the above formulas were then added in the indicated amounts. The temperature of 120° F. was maintained for 1 hour for the control sample and Sample B, and 4 hours for Sample C. The mixtures for each product was conveyed to can filling equipment at which point the cans containing the mixture are filled and sealed. The cans were then placed in baskets which were lowered into vertical retorts operated at a temperature of about 245°–250° F. The cans were held at this temperature for about 65 minutes. The cans were cooled, rinsed, and allowed to dry. The three canned products were fed to a group of 18 cats for a period of 4 days to determine the comparative palatability of Samples B and C as compared to the control. The results are set out in Table 2 below.

TABLE 2

| Sample | Total Consumption (qms) | No. of Cats Preferred | Statistical Significance |
| --- | --- | --- | --- |
| Control | 4878 | 7 | N.S. |
| B | 6109 | 10 | |
| Control | 5514 | 10 | N S. |
| C | 4475 | 8 | |

Although neither test product was statistically preferred to the control product, Sample B was numerically preferred to a slight extent. A reasonable conclusion is that the control and test samples are nearly equal in palatability. This equal degree of palatability is remarkable in view of the fact that Samples B and C container 56.8% of the biomass on a wet basis or 11.2% by weight on a dry basis and the control sample had a total fresh metal level of 68% by weight on a wet basis or 20% by weight on a dry basis. Samples B and C had a fresh meat level of about 18% by weight on a wet basis or only 5.4% on a dry basis. It is apparent that excellent palatability is maintained even when the product has a relatively low level of fresh meat.

Statistical evaluation was performed in accordance with the Wilcoxon Signed Rank Test*. This test is believed to provide a reliable statistical determination of whether there is, in fact, a preference for either ration in this type of palatability experiment wherein the test ration and control ration are simultaneously presented to each dog on a free choise basis.

The Wilcoxon signed rank test was proposed by F. Wilcoxon in Biometrics Bulletin, 1:80 (1945). Explanations and applications of this test may be found in: G. W. SNEDECOR, W. G. COCHRAN. *Statistical Methods*, 6th ed., pp. 128-130. The Iowa State University Press, Ames, Iowa (1967); Experimental Statistics, pp. 16-1 to 16-3. U.S. Department of Commerce, National Bureau of Standards Handbook 91 (1963); R. G. D. STEEL, J. H. TORRIE. Principles and Procedures of Statistics, pp, 402-403. McGraw-Hill Book Company, Inc., New York (1960); C. I. BLISS. Statistics in Biology, pp. 225-228. McGraw-Hill Book Company, Inc., New York (1967).

The above examples represent specific but non-limiting embodiments of the present invention. It is intended to include within the coverage of the present invention all reasonable equivalents or modifications thereto.

We claim:

1. A process of producing pet food product having a moisture content greater than about 45% by weight of improved palatability comprising;
    (a) forming a mixture of about 0.5 to 29% by weight meat solids on a dry basis and about 1 to 18% by weight filamentous fungal biomass solids on a dry basis, said biomas being formed by growth of a filamentous fungi selected from the genuses consisting of Aspergillus and Rhizopus on a fermentation media consisting essentially of soybean whey at a pH of about 3.8 to 5.8 and a temperature of about 28°-32° C.;
    (b) reducing the particle size of said mixture into pieces of a substantially uniform size;
    (c) heating said mixture to a temperature sufficient to pasteurize the mixture to form an pet food product having improved palatability.

2. The process of claim 1 wherein said filamentous fungi is selected from the group consisting of Aspergillus oryzae and Aspergillus niger.

3. The process of claim 1 wherein said biomass is grown at a pH of about 4.0 to 4.4 and a temperature of about 28°-32° C.

4. The process of claim 1 wherein the mixture comprises about 2 to 12% by weight fungal biomass solids of the total solids contained in said mixture on a dry basis.

5. The process of claim 1 wherein the meat is fresh meat.

6. The process of claim 1 including the step of adding nutritional balancing materials to said mixture prior to heating to form a nutritionally balanced pet food product.

7. The process of claim 6 including the step of packing the nutritionally balanced pet food product into a container prior to heating.

8. The process of claim 1 wherein the mixture is heated at a temperature of about 120° to 140° F.

9. The process of claim 1 including the step of retorting the mixture in order to sterilize the product.

10. A process of producing an pet food product having a moisture content greater than about 45% by weight of improved palatability comprising;
    (a) forming a mixture of about 0.5 to 29% by weight meat solids on a dry basis and about 1 to 18% by weigh filamentous fungal biomass solids on a dry basis, said biomass being formed by growth of a filamentous fungi selected from the genuses consisting of Aspergillus and Rhizopus on a fermentation media consisting essentially of soybean whey at a pH of about 3.8 to 5.8 and a temperature of about 28°-32° C.;
    (b) reducing the particle size of said mixture into pieces of a substantially uniform size;
    (c) adding nutritional materials to said mixture to provide a nutritionally balanced animal food product;
    (d) packing said product into a container;
    (e) heating said product to a temperature sufficient to pasteurize the product; and
    (f) retorting said container at a temperature and pressure sufficient to sterilize the product.

11. The process of claim 10 wherein said filamentous fungi is selected from the group consisting of *Aspergillus oryaze* and *Aspergillus Niger*.

12. The process of claim 10 wherein said biomass is grown at a pH of about 4.0 to 4.4 and a temperature of about 28°-32° C.

13. The proces of claim 10 wherein the mixture comprises about 2 to 12% fungal biomass solids by weight of the total solids in said mixture on a dry basis.

* * * * *